United States Patent [19]

Schueler

[11] Patent Number: 5,254,976
[45] Date of Patent: Oct. 19, 1993

[54] LIQUID LEAK DETECTOR APPARATUS AND METHOD

[75] Inventor: Robert A. Schueler, Oconomowoc, Wis.

[73] Assignee: Textron Inc., Providence, R.I.

[21] Appl. No.: 848,280

[22] Filed: Mar. 9, 1992

[51] Int. Cl.⁵ .............................. G08B 21/00
[52] U.S. Cl. .................... 340/605; 340/604; 340/606; 73/40.5 R; 73/49.2
[58] Field of Search ............ 340/604, 605, 606; 73/40.5 R, 49.2 T

[56] References Cited

U.S. PATENT DOCUMENTS

| | | |
|---|---|---|
| 4,591,837 | 5/1986 | Martinez ............... 340/605 |
| 4,602,250 | 7/1986 | Peace ..................... 340/605 |
| 4,679,587 | 7/1987 | Jarr ...................... 73/40.5 R |
| 4,708,015 | 11/1987 | Sharp ..................... 340/605 |
| 4,817,415 | 4/1989 | Mooney ............... 73/40.5 R |
| 4,921,004 | 5/1990 | Lane et al. ............ 137/318 |
| 5,067,094 | 11/1991 | Hayes ..................... 340/605 |

Primary Examiner—John K. Peng
Assistant Examiner—Edward Lefkowitz
Attorney, Agent, or Firm—Arthur J. Hansmann

[57] ABSTRACT

Liquid leak detector apparatus and method including a fluid system having two fluid tanks which are fluid flow interconnected and which have a fluid flow-rate switch operative between the tanks for detecting the quantity of flow for establishing equilibrium between the tanks and thereby detecting the leakage of fluid in the system.

24 Claims, 1 Drawing Sheet

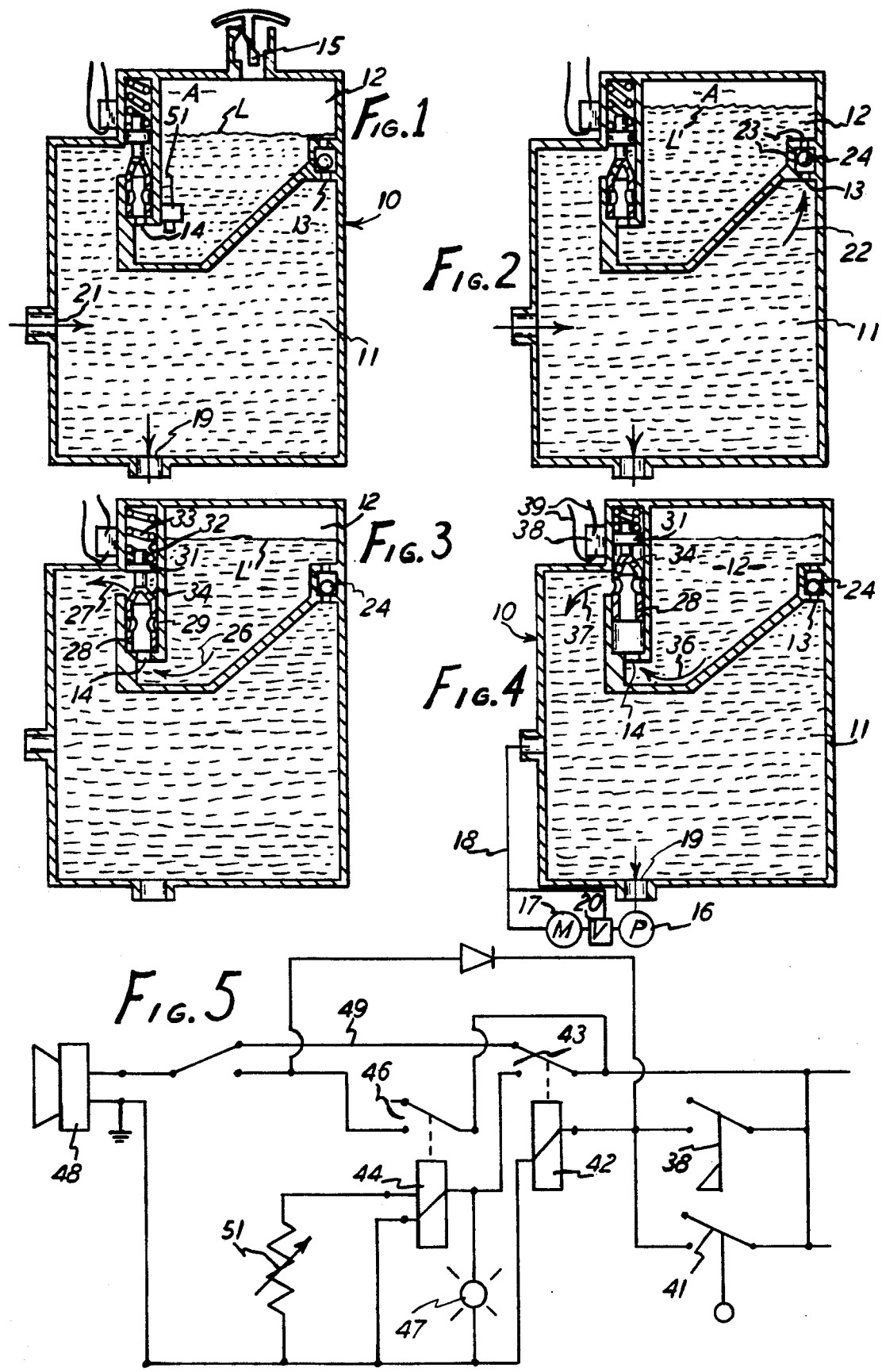

LIQUID LEAK DETECTOR APPARATUS AND METHOD

This invention relates to a liquid leak detector, and, more particularly it relates to a liquid leak detector which can be used on ground-mobile equipment which utilizes hydraulic fluid or the like and the detector of this invention will detect leaking of the fluid from the mobile unit.

BACKGROUND OF THE INVENTION

Ground-mobile vehicles, such as lawn maintenance equipment like lawn mowers of the commerical nature having a number of mowers, that is, gang mowers, commonly employ hydraulic apparatus for controlling and powering the mowers. In that type of equipment, there is a potential to have hydraulic fluid leaking from the hydraulic apparatus, and of course the hydraulic fluid will leak onto the turf and will be destructive. Commercial lawn mowers are relying more and more on hydraulics, but one problem with the hydraulics, particularly when mowing well-maintained and excellent turf, is that if there is hydraulic leakage, damage is done to the turf because of hot hydraulic fluid dropping onto the fine turf.

The prior art has systems installed on the equipment for the purpose of detecting hydraulic fluid leakage, and these systems operate so that they signal leakage only when it exists at a specific amount.

In contrast to the prior art, which is seen as one example in U S. Pat. No. 4,591,837, the present invention provides a hydraulic system leak detector wherein the detector does not rely on liquid volume changes created by thermal expansion or contraction nor on the liquid volume changes created by hydraulic cylinder actuation.

In approaching the solution to the problem of leakage, questions arose such as what quantity of leakage was sufficiently significant to detect and over what period of time did that leakage occur. Accordingly, leakage can be quantified in terms of hydraulic volume per unit of time. In this analysis, it was determined that monitoring flow rates of the liquid exchanged between two hydraulic tanks provided a system which could be employed to satisfy the detection requirements mentioned above.

Accordingly, the present invention provides for a hydraulic leak detector, particularly one that can be used for golf course greens and the like where the mowers are hydraulically controlled and hydraulically powered and where a leakage of hot hydraulic fluid can damage the turf. The detector of this invention is arranged with two liquid tanks and with passageways and controls therebetween to maintain pressure equilibrium betweem the two tanks. Specifically, this is achieved through detecting a flow-rate from a secondary tank into the main tank when the pressure equilibrium of the two tanks is upset, and the flow-rate detector energizes a switch which can signal the flow-rate and thus detect the leakage.

The present invention further distinguishes over the prior art in that the present invention does not utilize a liquid float member for detecting the level of the hydraulic fluid in a tank. One explanation of this improvement is that a float can become unreliable, or even stuck, when the mobile vehicle on which the tank is mounted is on a hillside or other non-level support. In contrast, the present invention utilizes a flow switch which is not affected by the mobile unit and its tank being off a level orientation.

Additionally, the present invention provides a leak detector wherein the detection is above a pre-selected flow rate datum and at which a flow switch will actuate an electric signal, such as a lamp, and, if the flow persists for a pre-selected time, then, a second signal, such as an audible alarm, will be energized, all to give the operator two different warning signals with regard to the flow rate of the hydraulic fluid between the two tanks. Subsequently, the flow switch will automatically reset itself and the lamp will be de-energized when the flow rate subsides below the datum.

BRIEF DESCRIPTION OF THE DRAWINGS

FIG. 1 is a sectional view through the tank portion of this invention, and it shows the level of fluid therein and the position of the flow-rate switch under the assumed condition that the hydraulic fluid had no thermal expansion, no thermal contraction, no leaks, nor any stored volumes additionally in cylinders.

FIG. 2 is a sectional view similar to FIG. 1, but indicating the level of fluid and the path of fluid flow in response to thermal expansion of the fluid.

FIG. 3 is a sectional view similar to FIG. 1, but indicating the level of fluid and the fluid flow where the condition is such that the flow of fluid between the upper and lower tank is such that the system is simply cooling down and the flow rate is not great enough to activate the system.

FIG. 4 is a sectional view similar to FIG. 1, but showing the fluid level and the flow of fluid from the upper tank to the lower tank and with the flow being sufficient to activate the flow-rate switch shown in the view, and with the fluid pump and the fluid motors or cylinders shown connected into the closed hydraulic system.

FIG. 5 is an electric schematic view of electric parts utilized in this invention.

DETAILED DESCRIPTION OF PREFERRED EMBODIMENT

FIGS. 1 through 4 show various conditions of operation of the system which includes the tank 10 having a main tank or reservoir 11 and a secondary tank or reservoir 12 and with the reservoirs 11 and 12 being fluid-flow interconnected through passageways 13 and 14. Also, there is an air vent 15 on the tank 12 to avoid fluid pressure in the tank 10. Further, FIG. 4 shows the system to include a liquid pump 16 and a liquid motor 17, or it could be a hydraulic cylinder, with the pump 16 and motor 17 being connected with the tank 11 through a usual hydraulic line 18, for instance, to thereby provide an enclosed system, including a liquid directional valve 20.

FIG. 1 shows the tank 10 under an assumed condition where the hydraulic liquid would not have any thermal expansion, thermal contraction, leaks, or small volumes. In that mode, liquid would be drawn from the main reservoir 11 and through the outlet 19 by means of the pump 16. The liquid would be returned to the main tank or reservoir 11 through the tank inlet 21. In that mode, there would be a level of liquid, as indicated at L in the secondary or upper tank 12. There would be no liquid exchange between the reservoirs 11 and 12 because they are in equilibrium.

FIG. 2 shows the condition when thermal expansion of the liquid occurs. In that mode, liquid will flow from the tank 11 and up into the tank 12, such as indicated by the liquid-flow arrow designated 22, and the flow would be through the passageway 13, and liquid would continue to flow through the passageways 23 and into the tank 12. There is a ball check valve 24 trapped in the shown cage which has passageways 13 and 23, and the check 24 precludes the return flow of liquid through passageways 23 and 13 and into the tank 11. In that mode, the liquid level becomes L' which is at a level above the elevation of the level under the mode in FIG. 1. This condition produces fluid pressure equilibrium between the tanks 11 and 12.

In the FIG. 3 mode, the liquid level in the secondary tank 12 is at that level of FIG. 2, and the condition is such that the hydraulic system is cooling down and thus the volume of liquid in the system is decreasing. This decrease in liquid volume must be made up from the liquid in the secondary reservoir or tank 12 from whence the fluid can be drawn into the tank 11. Since the fluid is checked by the check valve 24 and thus cannot go through the passageway 13, the fluid will follow the arrows designated 26 and 27 and flow through the passageway 14 and past a piston 28 which is movably mounted in a cylinder 29 affixed in the tank 10 for slidably receiving the piston 28. The piston 28 also has a piston section 31 which is slidable in the cylindrical chamber 32 in the tank 10, and compression spring 33 is interposed between the tank 10 and the piston 31 for urging the entire piston assembly downwardly to the position shown in FIG. 3.

In FIG. 3, in restoring the equilibrium to the system, the fluid flows in accordance with the indicated flow arrows 26 and 27, but it is assumed in that condition that the flow is not at a sufficient rate which will displace the piston 28 upwardly, and thus the piston remains in the downward position of FIG. 3 and fluid simply passes through the opening 14, through openings, such as opening 34 in the hollow piston 28, and around piston 28 to thereby flow from the upper tank 12 and into the lower tank 11, but without displacing or elevating the piston 28. The flow rate is only at a rate consistent with the rate created by the contraction of the fluid due to cooling. That is, there is no signal generated to indicate that the flow rate is in excess of the level which is built into the system to thereby have the piston 28 remain positioned downwardly and not react by moving upwardly to activate a signal which would otherwise be activated if the flow rate were greater than that under the condition shown in FIG. 3.

FIG. 4 depicts the mode of operation when the flow of liquid from the upper reservoir 12 is greater than the minimal set amount, and flow arrows 36 and 37 show the flow of the fluid, and again the check valve 24 would be precluding the flow of fluid through the passageway 13 and downwardly into the tank 11. In the mode or condition depicted in FIG. 4, it is assumed that there is a rate of flow above a pre-selected amount, and that higher flow rate causes the piston 28 to be lifted up or elevated, such as to the position shown. That greater or increased flow rate is created by the fact that there was a leak in the system and the flow rate must now be greater in order to compensate for the loss of fluid from the system when the fluid is seeking its equilibrium between the tanks 12 and 11. Also, the piston 28 will assume the shown elevated position when the fluid must be added to a hydraulic cylinder, for instance. Accordingly, the piston 28 detects the flow rate in the flow as indicated by arrows 36 and 37, and if that flow rate is above the pre-selected level, then the light signal will be activated and the timer started. Accordingly, the flow rate switch includes the pistons mentioned, and in actuality, piston 31 is magnetic, and there is a magnetic reed switch 38 mounted on the tank 10 adjacent the magnet 31 which therefore activates the reed switch 38 when in the elevated position shown in FIG. 4. Of course the reed switch 38 is of a conventional design, and the magnet utilized in combination with the responsive switch 38 is conventional and will be understood by one skilled in the art. Of course electric wires 39 extend from the switch 38 and off to electric signals for indicating to the operator that the flow rate, under the condition of FIG. 4, is above the pre-selected amount and the operator is therefore informed and alerted.

In this embodiment, the switch 38 is connected to a lamp, and, further, if the high flow rate persists after a pre-selected time, then an audible alarm, which is also connected to the switch 38, will be activated. The pre-selected amount of time that the audible alarm is delayed is the amount of time it takes the system to re-establish equilibrium after filling a hydraulic cylinder. Also, once equilibrium is re-established, the flow switch will reset itself, and the lamp will be de-energized, and there will not be an audible alarm unless the elevated flow rate continues beyond the pre-selected time interval mentioned.

Accordingly, the system accomplishes several desirable results, including detecting a leak and alerting the operator, compensating for thermal expansion of the fluid, compensating for thermal contraction, and compensating for the volume changes caused by cylinder actuation.

FIG. 5 goes even a bit further in showing the electric schematic wherein the switch 38 is shown, and it also shows an optional liquid level switch 41. There is an electric solenoid 42 connected with the switch 38 and also connecting with a switch 43. Further, there is an electric time delay solenoid 44 connecting with a switch 46, and a signal lamp 47 connected intermediate the solenoids 42 and 44, as mentioned. An audible signal 48 is electrically connected between the time delay solenoid 44 and the other side of the line designated 49. As such, and as mentioned, the circuit is arranged so that the visual signal 47 will be energized before the sound signal 48 is energized, and the time delay established by the time delay solenoid 44 is determined and selected in accordance with the amount of time required for equalizing the balance of pressure between the tanks 11 and 12, under the mode of FIG. 4, for cylinder actuation, as mentioned. The pre-selected flow rate can be determined by the force of the spring 33 and the weight of the piston 28/31, and the friction forces on and the resistance to flow through and around the piston 28. That is, it is the force required to raise the piston 28/31, and the time to sustain it.

Thusly, when the motor or cylinder 17 is receiving liquid, the switch 38 is activated and the signal 47 is energized, however, timer 44 does not expire so sound signal 48 is not energized. Only during a liquid leak, causing sustained flow from tank 12 into tank 11, is switch 38 activated long enough for energizing signal 48 along with signal 47.

Additionally, the system can be sensitive to the temperature changes of the liquid, and those changes affect liquid viscosity. When the liquid is colder, the flow switch assembly is more sensitive, so it stays open longer, compared to responses at warmer liquid temperatures. A temperature sensor 51 electrically connected into the circuit, as shown in FIG. 5, will react to the liquid temperature, all to render the timer 44 longer acting when the liquid is colder; and the timer 44 is shorter acting when the liquid is warmer. The sensor 51 is a well-known electronic sensor of the type which generates a higher electrical resistance when it is cold, compared to when it is warmer, and it can be disposed in tank 12, adjacent the inlet to the switch cylinder 29 to detect the temperature of the liquid moving through the cylinder 29.

Although the invention is described with respect to a preferred embodiment, modifications thereto will be apparent to those skilled in the art. Therefore, the scope of the invention is to be determined by reference to the claims which follow.

What is claimed is:

1. A liquid leak detector comprising a main liquid tank and a secondary liquid tank in liquid-flow communication with each other and being in an enclosed liquid-flow system, a liquid flow passageway disposed in liquid flow communication between said tanks for liquid flow therebetween, said tanks and said passageway being arranged to effect liquid pressure equilibrium flow between said tanks, a liquid-flow responsive member movably disposed in said passageway and being arranged to be movable in response to said liquid pressure equilibrium being established between said tanks as a consequence of liquid flow through said passageway from said secondary tank and into said main tank, an electric switch operatively associated with said liquid-flow responsive member and being electrically switchable in response to movement of said liquid-flow responsive member, and an electric signal electrically connectable with said switch for signaling liquid flow through said passageway.

2. The liquid leak detector as claimed in claim 1, including an electric operative relay electrically connected with said switch for effecting electric operation of said signal.

3. The liquid leak detector as claimed in claim 2, including an additional signal electrically connectable with said switch, and including an electrically effective time-delay relay electrically connectable between said signals for electric connection of said additional signal subsequent to the electric connection of the first-mentioned said signal.

4. The liquid leak detector as claimed in claim 3, wherein said signals are of two different types, namely, a light signal and a sound signal.

5. The liquid leak detector as claimed in claim 1, including an additional liquid flow passageway extending between said tanks for liquid flow therebetween, and a check valve disposed in said additional liquid flow passageway for preventing the flow of liquid from said secondary tank to said main tank and through said additional liquid flow passageway.

6. The liquid leak detector as claimed in claim 1, wherein said secondary tank is at an elevation above that of said main tank for receiving overflow of liquid from said main tank and subsequently draining back into said main tank.

7. The liquid leak detector as claimed in claim 5, wherein said secondary tank is at an elevation above that of said main tank and with said additional liquid flow passageway being arranged for receiving overflow of liquid from said main tank and with the first-mentioned said liquid flow passageway being arranged for liquid flow subsequently draining back into said main tank, and an air vent on said secondary tank.

8. The liquid leak detector as claimed in claim 1, wherein said liquid flow responsive member is arranged in said passageway to respond in accordance with the rate of flow of liquid through said passageway.

9. The liquid leak detector as claimed in claim 8 wherein said switch is arranged to respond only to at least a minimum rate of flow of liquid through said passageway.

10. The liquid leak detector as claimed in claim 9, including an electric time-delay relay electrically connected with said switch for delaying electric operation of said signal.

11. The liquid leak detector as claimed in claim 8, including an electric operative relay electrically connected with said switch for effecting electric operation of said signal.

12. The liquid leak detector as claimed in claim 9, wherein said secondary tank is at an elevation above that of said main tank for receiving overflow of liquid from said main tank and subsequently draining back into said main tank.

13. The liquid leak detector as claimed in claim 1, wherein said switch is a magnetic type switch responsive to the movement of said liquid-flow responsive member.

14. The liquid leak detector as claimed in claim 1, including a spring operative on said liquid-flow responsive member to yieldingly urge said liquid-flow responsive member against the direction of flow of liquid in said passageway from said secondary tank to said main tank.

15. A liquid leak detector having a liquid-flow system comprising a main liquid tank and a secondary liquid tank, a first liquid flow passageway disposed in liquid-flow communication between said tanks for liquid flow only from said main tank to said secondary tank, a second liquid flow passageway extending between said tanks for the flow of liquid only from said secondary tank to said main tank, a flow-rate responsive member movably disposed in said second liquid flow passageway and being movable in accordance with the rate of flow of liquid from said secondary tank and into said main tank, means for detecting the flow rate movement of said flow-rate responsive member and to thereby signal the flow rate through said second passageway, and a liquid pump in liquid-flow connection with said main tank for pumping liquid through said system and thereby increasing liquid volume in both said tanks by heating the liquid and said second liquid flow passageway and said flow-rate responsive member are arranged to subsequently release the heated liquid to flow from said secondary tank and into said main tank when said pump is not pumping.

16. The liquid leak detector as claimed in claim 15 including an electric type of time-delay member connected with said means for delaying signaling operation of said means, and an electrically operative temperature sensor disposed in said liquid and electrically responsive to the temperature of said liquid and being electrically connected with said time-delay member for affecting operation of said time-delay member.

17. The liquid leak detector as claimed in claim 15, including an additional liquid flow passageway extending between said tanks for liquid flow therebetween, and a check valve disposed in said additional liquid flow passageway for preventing the flow of liquid from said secondary tank to said main tank and through said additional liquid flow passageway.

18. The liquid leak detector as claimed in claim 15, wherein said flow-rate responsive member is arranged to be flow responsive only to at least a minimum rate of flow of liquid through said passageway.

19. The liquid leak detector as claimed in claim 18, wherein said means includes a magnetic type switch responsive to the movement of said liquid flow-rate responsive member.

20. A leak detector for detecting a leak in a closed system, comprising means for directing the flow of liquid into a tank and through a first liquid flow passageway in liquid-flow communication with said tank, means for directing the flow of said liquid out of said tank and through a second liquid flow passageway in liquid flow communication with said tank, means disposed in said second liquid flow passageway for sensing the rate of flow of said liquid out of said tank only when said rate of flow is in excess of a pre-selected amount, and means for signaling the rate of liquid flow out of said tank in accord only with the rate of flow in excess of said pre-selected amount.

21. A method of detecting a leak in a liquid system, comprising the steps of directing flow of the liquid into a first tank, and thereby creating an overflow of the liquid relative to said first tank, directing said liquid overflow through a first liquid flow passageway and into a second tank, directing said liquid overflow through a second liquid flow passageway and out of said second tank, sensing the rate of flow of said liquid overflow through said second liquid flow passageway and out of said second tank only when said rate of flow is in excess of a pre-selected amount, and activating a signal in accordance with said sensing of the rate of overflow out of said second tank and only in excess of said pre-selected amount.

22. The method of detecting a leak in a liquid system, as claimed in claim 21, wherein said signal is activated in a first form in accord with a minimum rate of flow of said overflow liquid, and said signal is activated in a second form in accord with a rate of flow of said overflow liquid in excess of said minimum rate of flow.

23. The method of detecting a leak in a liquid system, as claimed in claim 22 wherein said first form of said signal is detected visually and said second form of said signal is detected audibly.

24. The method of detecting a leak in a liquid system, as claimed in claim 21, including sensing the temperature of said liquid flowing out of said second tank and communicating the temperature degree value to said signal to thereby control the timing of the operation of said signal.

* * * * *